INVENTOR.
JOHN H. BAKER JR.

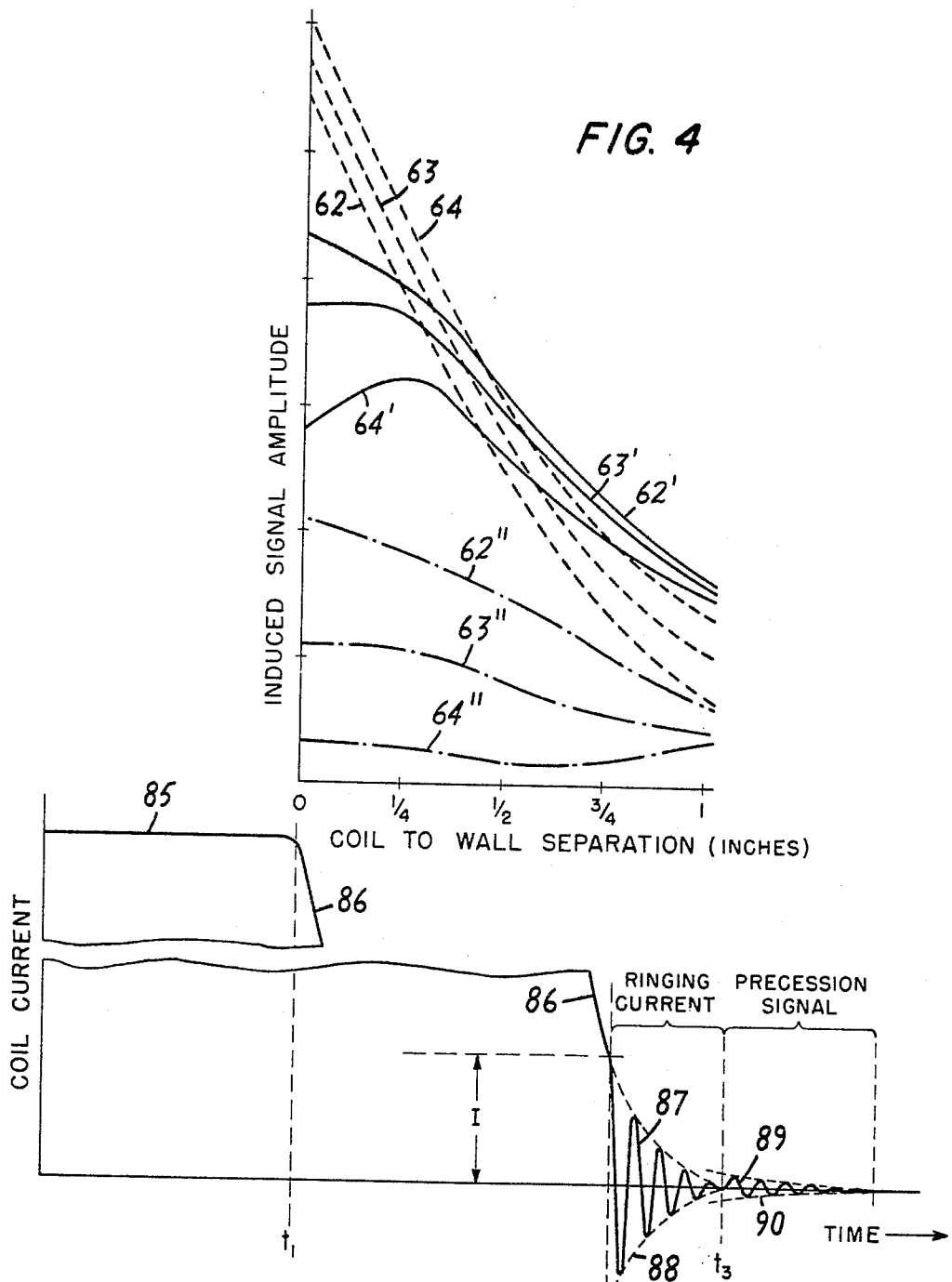

United States Patent Office 3,483,465
Patented Dec. 9, 1969

3,483,465
NUCLEAR MAGNETISM LOGGING SYSTEM UTILIZING AN OSCILLATED POLARIZING FIELD
John H. Baker, Jr., Houston, Tex., assignor to Schlumberger Technology Corporation, Houston, Tex., a corporation of Texas
Filed Mar. 25, 1966, Ser. No. 537,475
Int. Cl. G01n 27/78
U.S. Cl. 324—.5                                     18 Claims

ABSTRACT OF THE DISCLOSURE

In the particular embodiments of the invention described herein, an instrument which is to be lowered in a well bore includes a polarizing coil and circuit for reducing the current supplied to the coil to a selected low level at a controlled rate to detect protons by magnetic resonance. The low strength field is caused to oscillate at the Larmor frequency and the oscillating field strength is reduced to zero at a controlled rate prior to connection of the polarizing coil to a detecting circuit.

---

This invention relates to systems for inducing and responding to nuclear magnetism effects and, more particularly, to a new and improved system for logging nuclear magnetism effects in a well bore by which the ability to obtain useful information regarding the earth formations surrounding the well bore is substantially increased.

In nuclear magnetism logging, the presence of matter containing gyromagnetic nuclei which are relatively free to move is determined by inducing coherent precession of the nuclei about a magnetic field. More particularly, nuclear magnetism logging in well bores is used to discover the presence of hydrogen nuclei or protons in fluid media, such as water or oil, within the formations surrounding the well bore. For this purpose, a strong magnetic field is applied to the formations tending to align or polarize the magnetic moments of the relatively free protons in a given direction. After the strong magnetic field is removed, the protons tend to precess about the axis of a weaker field which may be the earth's magnetic field, the latter field being disposed at an angle to the polarizing field.

Many of the previously aligned protons will, for a very short time after discontinuance of the polarizing field, tend to precess in synchronism about the axis of the earth's magnetic field and the synchronized precession of those protons will induce signals in a detecting coil disposed in the well bore. Such proton precession signals may be analyzed to provide a measure of the abundance of relatively free protons and, therefore, of the concentration of hydrogen-containing fluids, such as oil, water or gas. In addition, the rate at which equilibrium conditions are established after application or termination of a polarizing field, known as the thermal relaxation time, may be determined to provide an indication of the nature of the hydrogenous material.

The duration of the measurable proton precession signals, however, is a small fraction of one second and its magnitude is extremely small with respect to the polarizing field current and the transient signals produced by termination of that current. Moreover, there are many factors which tend to obliterate the detected precession signals or reduce their magnitude to an undetectible level in an even shorter time. For example, for the case of a tool which is held against the wall of the well bore, because the magnitude of the detected signal depends upon the volume of signal-producing material within range of the detecting coil and because that range may be of the order of an inch, movements of the detecting coil away from the wall by small fractions of an inch can substantially reduce the volume of signal-producing material and, therefore, introduce relatively large erroneous indications into the measurements. Furthermore, the rapid termination of the relatively high strength polarizing field, which is necessary in order to permit detection of rapidly decaying precession signals, tends to produce transient signals of substantial magnitude which interfere with detection of the precession signals.

Accordingly, it is an object of the present invention to provide a new and improved system for nuclear magnetism well logging which overcomes the above-mentioned disadvantages of the present systems.

Another object of the invention is to provide a nuclear magnetism well logging system which is relatively insensitive to small separations between a detecting coil and the wall of the well bore.

A further object of the invention is to provide a new and improved nuclear magnetism logging system permitting rapid termination of a high strength polarizing field without producing any appreciable transient signals.

These and other objects of the invention are attained by reducing the strength of the polarizing field to a selected level and then causing this field to oscillate or "ring" with this "ringing" decreasing or decaying at a predetermined rate selected according to the initial ringing field strength to cause the magnetic moments of the synchronously precessing protons to be tilted at the maximum angle (90 degrees) with respect to the axis of the earth's magnetic field at the location in question so as to produce maximum signal in a detecting coil. Because the extent of this tilting depends upon the field strength at which ringing is initiated and since field strength varies as the distance from the polarizing coil increases, the strength of the field at the time ringing is initiated can be selected, along with the decay rate of the subsequent alternations of the ringing field to cause the precessing protons at a selected distance from the coil, i.e., depth in the formation, to be tilted the maximum amount and, therefore, provide the greatest proportional contribution to the signal detected from the precessing protons. In this way, the system is rendered relatively insensitive to separations between the detecting coil and the wall of the well bore less than the selected distance, which may be of the order of an inch.

Following the damping out of the ringing field, which occurs in a very short time, the amplitude of the signal produced by the synchronously precessing protons, which decreases rapidly for the reasons given above, is analyzed so as to provide an indication of the magnitude of that signal at the time precession was initiated, the proton precession signal not having been detectable at that time because of the higher amplitude ringing magnetic field signal. For this purpose, the detected signal magnitude is preferably integrated over at least two different periods of time and the integrated values are compared with known information about the decay rate of precession signals to provide a measure of the initial precession signal magnitude.

Moreover, to aid in determining the relaxation time of the protons, the duration of application of the initial high strength polarizing field can be varied through a series of intervals shorter than the normal duration and the resulting precession signals compared to indicate the minimum time in which substantially complete polarization is produced. Inasmuch as the relaxation time may vary with polarizing field strength, the polarizing field strength may be held at a low level after reduction from a high level but prior to initiation of the ringing field current and the duration of application of the low level polarizing field can also be varied through a series of intervals longer than the normal low field duration. The resulting signal measurements are compared to provide a measure of the time in which equilibrium conditions are obtained at low polarizing field strength.

In a representative apparatus for use in nuclear magnetism logging measurements in the formations adjacent to a well bore, a polarizing field coil is arranged in an instrument adapted to be passed through the well bore so as to induce a strong polarizing field in the formations at substantially right angles to the earth's magnetic field and having a strength many times that of the earth's field. A timing system initiates and terminates the high field strength current applied to the polarizing coil while permitting variations in the duration of application of the current and also introduces impedance into the circuit leading to the coil in a controlled manner so as to provide the desired rate of reduction of the field strength. In addition, in one embodiment the timing system controls the initiation of the alternating field current after the polarizing field has been maintained at a low level for a selected period of time. In another embodiment, the alternating current is initiated when the polarizing current has been reduced to a selected level. Furthermore, the timing system connects to the precession signal detecting coil, which may be the same as the polarizing coil, a signal detecting and processing circuit after the oscillations of the alternating field have been damped sufficiently to permit detection of the precession signals.

Further objects and advantages of the invention will be apparent from a reading of the following description in conjunction with the accompanying drawings, in which:

FIG. 4 is a composite graphical representation illustrating the changes in detected signal amplitude with increasing coil-to-wall separation for various ringing current initial amplitudes and ringing current decay rates;

FIG. 5 is a schematic circuit diagram illustrating a modified form of apparatus according to the invention; and FIG. 6 is a condensed graphical representation showing variations with respect to time in the current passing through the coil of the apparatus of FIG. 5 during a particular logging operation.

Figure 1:
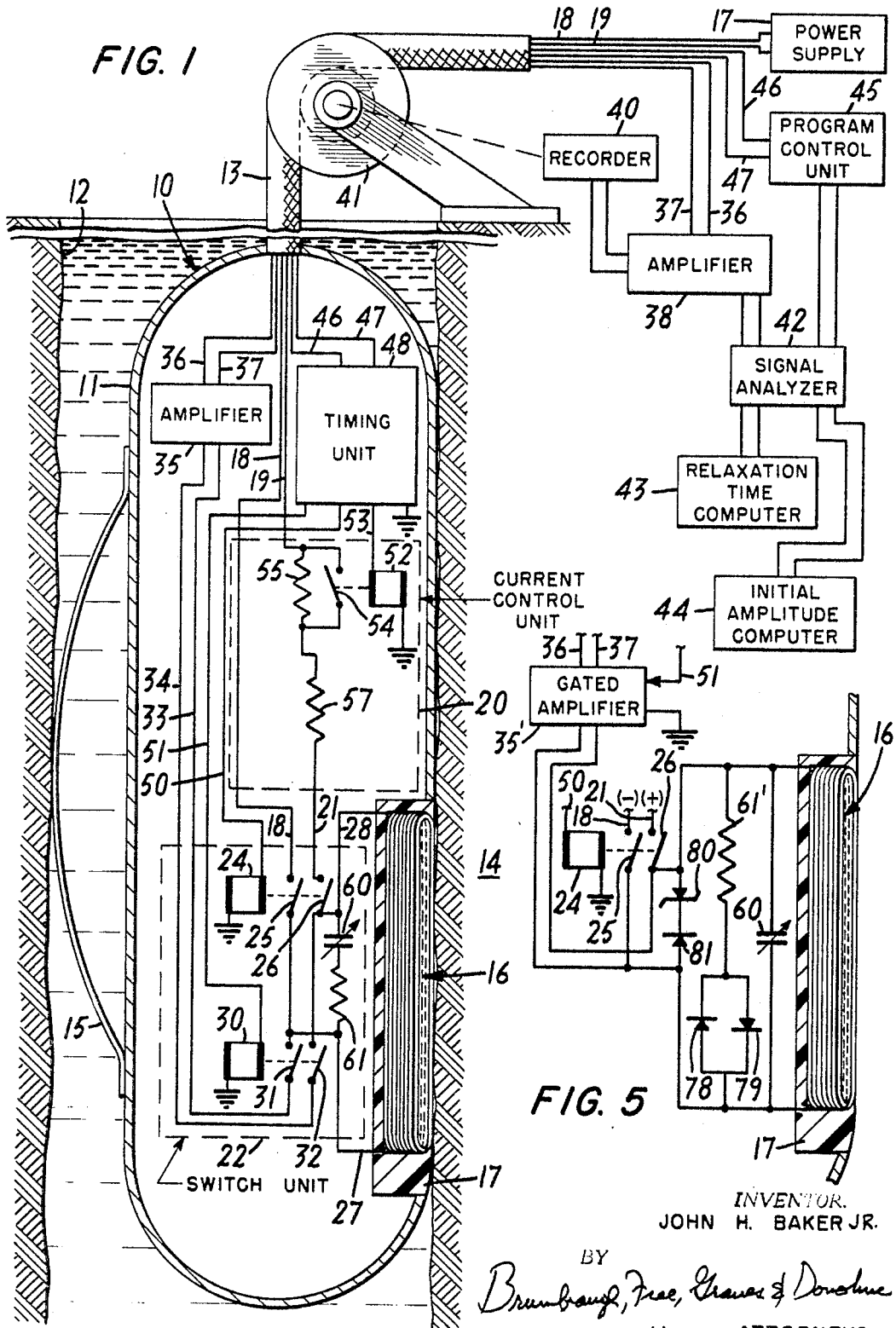
FIG. 1 is a schematic diagram partly in section illustrating one form of nuclear magnetism logging apparatus arranged according to the invention.

In the representative nuclear magnetism logging apparatus for use in well bores shown in FIG. 1, a downhole instrument 10 comprises an elongated pressure resistant housing 11 suspended in the well bore 12 by a multiconductor cable 13. In order to hold the housing 11 against the wall of the bore 12 so as to facilitate investigation of the adjacent earth formation 14, the instrument 10 includes a bow spring 15 engaging one side of the bore, thereby urging the housing 11 against the opposite side of the well bore.

Mounted in the housing 11 at the side opposite to the spring 15 is a vertically elongated coil 16 supported in a non-magnetic insert 17 in the housing 10, the insert being made, for example, of a rigid plastic material. The coil 16 is disposed closely adjacent to the wall of the well bore against which the housing is urged so that the strength of the magnetic field produced by the coil in the portion of the formation 14 at which measurements are to be made will not be diminished appreciably.

In order to supply current to the coil 16 so as to induce polarization of free protons in the formation 14, a direct current power supply 17 at the surface of the earth is connected through two conductors 18 and 19 of the cable 13 to a current control unit 20 in the instrument 10. If desired, rather than utilizing a direct current power supply, an alternating current power supply may be provided at the surface of the earth and a rectifying unit may be included in the circuit within the downhole instrument 10. The control unit 20 is, in turn, connected through two conductors 18 and 21 to a switch unit 22 where a first switch device, such as a relay 24, connects the conductors 18 and 21 through two normally opened contacts 25 and 26 to the input leads 27 and 28, respectively, of the coil 16. Inasmuch as the coil 16 is also used to detect the signals produced by precessing protons in the formation 14 after the polarizing current has been shut off, the switch unit 26 also includes a further switch device, such as a relay 30, having two normally opened contacts 31 and 32 by which the coil leads 27 and 28 may be connected to two conductors 33 and 34 leading to a conventional amplifier 35. From that amplifier, two further conductors 36 and 37 carry the signals through the cable 13 to a further amplifier 38 at the surface of the earth.

To provide a visual representation, as well as a permanent record, the amplified proton precession signals are applied to a conventional recorder 40 which may comprise, for example, an oscilloscope on which the amplified signal is presented as a function of time, and a camera for recording successive traces which appear on the oscilloscope screen. Moreover, in order to correlate the successive measurements made by the apparatus with the depth of the formation being analyzed, the recorder 40 is linked to a pulley 41 over which the cable 13 passes as the instrument 10 is drawn through the well bore.

In addition, the signals from the amplifier 38 are applied to a signal analyzer 42 which produces outputs representing the amplitude of the precession signals at selected time intervals and applies them to a relaxation time computer 43 and to an initial amplitude computer 44 which operate in the manner described hereinafter to provide indications of the relaxation time and of the proportion of free protons in the formation, respectively. The operation of the signal analyzer 42, the relaxation time computer 43 and the initial amplitude computer 44 is coordinated by a program control unit 45 which also controls the operation of the downhole instrument 10 by transmitting appropriate signals through two conductors 46 and 47 to a timing unit 48 within the instrument.

Under ordinary conditions, the timing unit 48 responds to a measurement initiation signal from the program control unit 45 to energize the relays 24 and 30 through corresponding conductors 50 and 51 and also a relay 52 in the current control unit 20 through a conductor 53 in a predetermined timed sequence as described hereinafter so as to apply a high level polarizing current to the coil 16 for a selected time, reduce the current to a low level after another time interval, shut off the polarizing current completely after a further interval and then, after another interval of time, connect the coil 16 to the amplifier 35 for use as a detecting coil. Also, in response to signals from the program control unit, the timing unit 48 is adapted to vary the duration of the high level polarizing current or the low level polarizing current through a series of different values for successive measurements.

Within the current control unit 20, the relay 52 has a normally opened contact 54 adapted, when closed, to shunt a resistor 55 which is connected in series between the power supply line 19 and a further resistor 57 which is connected to the conductor 21 so as to apply current only through the resistor 57 and thereby provide the high level polarizing current. Inasmuch as the rate of decrease of the polarizing field strength depends upon the resistance in circuit with the coil 16, the values of the resistors 55 and 57 can be selected so as to provide a controlled rate of reduction of the polarizing field strength to a level comparable to the strength of the earth's field in a time interval which is substantially greater than the period of the Larmor frequency but much less than the relaxation time of the protons. This relatively gradual reduction in the strength of the polarizing field permits the direction of alignment of the polarized protons to follow simultaneously the changing direction of the resultant magnetic field so that, when the low level field is terminated, all of those protons will begin precessing from substantially identical angular orientations at substantially the same time so as to be more nearly in phase.

In one mode of operation, the polarizing field strength is maintained for a selected period of time at a relatively low level which, in the region of measurement, is comparable to and preferably somewhat lower than the strength of the earth's magnetic field, after being reduced in a controlled manner from the initial high level. For this purpose, the values of the resistors 55 and 57, which are inserted in the circuit to control the strength of the field at the low level, can be selected so as to make certain that the coil current produces a field having a strength in the formation region of interest which is at the desired level.

The frequency of the ringing current is made approximately equal to the Larmor frequency or frequency of precession of the protons in the earth's magnetic field. This allows the same coil-capacitor circuit to be used both for producing the ringing current and for detection of the precession signals. In order to produce the ringing current in the coil 16, the switch unit 22 includes an adjustable capacitance 60 connected in series with a resistance 61 across the leads 27 and 28 from the coil 16. Inasmuch as the Larmor frequency for the earth's field depends upon the strength of the earth's field which varies somewhat from one location to another, the strength of the earth's field at the location of the logging operation is preferably measured in any conventional manner and then the capacitance 60 is adjusted to make the resonant frequency of the coil-capacitance combination as nearly as possible equal to the Larmor frequency of the protons in the measured earth's magnetic field strength.

Furthermore, the resistance value of the resistor 61 is selected to provide a time constant for the coil-capacitor circuit which, in conjunction with the initial ringing current field strength in the region of measurement, will make the angle through which the parallel axes of the precessing protons are tilted away from the direction of the earth's field as close as possible to 90 degrees in the region of measurement. It can readily be shown that the angle of this tilting resulting from a decaying ringing field imposed perpendicularly to the earth's field and having an initial strength H in the region of interest is approximately equal to half the value of the proton gyromagnetic ratio multiplied by H and by the time constant of the ringing circuit.

In this connection, the instantaneous magnetic field strength $h$ produced at any given time $t$ at any given lateral distance from the face of the coil by the ringing current is given by the relationship:

$$h = He^{-t/\tau} \cdot \cos \omega t, \quad (1)$$

where the ringing field at that distance has an initial amplitude H at time $t=0$ and is decaying at a rate of $e^{-t/\tau}$. Inasmuch as the magnetic field strength decreases with distance from the coil, the actual value of $h$ will be smaller at greater distances from the coil. The factor $\tau$ is the time constant of the coil-capacitor ringing circuit and is described by the expression:

$$\tau = Q/\omega \quad (2)$$

where Q is the usual circuit Q and $\omega$ is the undamped resonant frequency of the coil-capacitor circuit and is defined by the expression:

$$\omega = \frac{1}{\sqrt{LC}} \quad (3)$$

Assuming the polarizing field and the subsequent ringing field are applied at right angles to the earth's magnetic field, and the initial ringing field strength H is on the same order of magnitude as the earth's field strength, then the aligned polarized protons will commence their synchronous precession about the direction of the earth's field as soon as the ringing field is initiated and the angle $\phi$ between the direction of alignment of the protons and the earth's field in the frame of rotation at any subsequent time is given by the following relation $$\phi(t) = \int_0^t \frac{\gamma H}{2} e^{-t/\tau} dt \quad (4)$$

where $\gamma$ is the gyromagnetic ratio. Accordingly, after a time interval much greater than the circuit time constant, when $t$ can be considered as infinity, $$\phi(\infty) = \int_0^\infty \frac{\gamma H}{2} e^{-t/\tau} dt \quad (5)$$

but $$\int_0^\infty e^{-t/\tau} dt = \tau \quad (6)$$

so that $$\phi(\infty) = \frac{\gamma H}{2} \tau \quad (7)$$

Substituting the value of $\tau$ from Equation 2 gives:

$$\phi = \frac{\gamma H Q}{2\omega} \quad (8)$$

This gives the angle of tilting $\phi$ in terms of the three ringing current parameters, namely, the frequency $\omega$, the initial amplitude $h$, and the rate of decay which is defined by the Q factor. Thus, for $\phi = 90°$, i.e., the desired maximum tilting, H, Q and $\omega$ may be selected to produce the desired result. For practical reasons, as described above, the ringing current frequency $\omega$ is preferably made equal to the Larmor frequency in the earth's field. The initial amplitude H is dependent on two factors, namely, the initial amplitude I of the ringing current and the lateral distance $x$ from the face of the coil. This might be written as:

$$H = \frac{F(I)}{f(x)} \quad (9)$$

Substituting this into Equation 8 gives:

$$\phi = \frac{\gamma Q}{2\omega} \cdot \frac{F(I)}{f(x)} \quad (10)$$

To produce the desired $\phi = 90°$ for predominate response from a desired lateral distance $x$ and with $\omega$ set at the Larmor frequency for the earth's field, then the necessary values of I and Q can be determined so as to satisfy Equation 10. As previously mentioned, in order for $\phi$ to be equal to 90° at a particular distance $x$, the ringing magnetic field component at the distance $x$ must have a particular initial value H for any given rate of decay Q. Determination of the factor Q, will depend upon whether a series or parallel circuit is used. For the case of a series coil-capacitor ringing circuit, such as is shown in FIG 1:

$$Q = \frac{R_o}{R_s} = \frac{1}{R_s}\sqrt{\frac{L}{C}} \quad (11)$$

where $R_s$ denotes the series circuit resistance represented by the resistor 61 and $R_o$ represents the characteristic impedance of the coil-capacitor circuit. For the case of a parallel coil-capacitor circuit such as is shown in and described hereinafter with reference to FIG. 5.

$$Q = \frac{R_p}{R_o} = R_p\sqrt{\frac{C}{L}} \quad (12)$$

where $R_p$ denotes the parallel circuit resistance represented by the resistor 61' of FIG. 5. In every case, the value of Q must be greater than one half in order to produce ringing. When Q is equal to one half there is critical damping and for Q less than one half no ringing is produced.

Referring now to FIG. 4, the manner in which the induced precession signal amplitude varies as a function of coil-to-well wall separation is illustrated for different values of circuit Q and different values of initial ringing current amplitude I. The dash line curves 62, 63 and 64 illustrate the variation in amplitude for low, medium, and high initial ringing current amplitudes I, respectively, in a low Q circuit. The solid lines 62', 63' and 64' represent the variation in induced signal amplitude for the same low, medium, and high initial ringing currents for a medium Q circuit, and the dot-dash lines 62", 63" and 64" show the effect of a high Q circuit. The coil-to-wall separation is the lateral distance from the face of the coil to the earth proper and may span a void or a layer of mudcake on the wall of the well. In this graph, the induced signal amplitude is the induced electromotive force in the coil before it is altered by the circuit Q. In other words, it is the induced voltage measured without drawing any appreciable current. The precession signal amplitude is the extrapolated initial amplitude of the precession signal as discussed hereinafter in connection with FIG. 3. Alternatively, the envelope of the precession signal at some other fixed moment of time may be used as the basis for the comparison.

For any particular set of circuit and instrument conditions several sets of curves like those in FIG. 4 may be run to determine the optimum combination of initial amplitude and circuit Q. One optimum combination is represented by the curve 63' which shows that the induced precession signal does not vary with changes in separation up to about one quarter inch and then does not vary so fast as, for example, the low Q curves 62, 63 and 64. It will be noted that the optimum combination of I and Q, however, is not necessarily the one which produces the largest precession signal, since the low Q arrangements produce the larger precession signals provided, of course, there is no separation, but those arrangements are highly sensitive to separation changes. The low Q signal variations with changes in separation may, in many cases, be larger than the precession signal characteristic one is attempting to measure. On the other hand, the high Q circuit is not as desirable either because, as shown by the curves 62", 63" and 64", although there is less sensitivity to separation variations, the signal amplitude is enough lower than in the medium Q case to prevent much of the useful information from being detected.

The FIG. 4 curves can be explained in terms of Equation 10 above. Assuming that $\phi = 90°$, that the initial ringing field current I is a medium value as represented by the curves 63, 63' and 63", and $\omega$ equals the Larmor frequency for the earth's field, then Q and $x$ are the only variables. It is then seen that the separation distance $x$ to the region of maximum response (i.e., 90° tilting) will be a direct function of Q. For a low Q, i.e. curve 63, the distance $x$ will be small and the response will be mainly from close in. Because of its closeness, the induced precession signal amplitude will be greater. As mentioned, however, the system is then sensitive to separation variations.

At the other end of the spectrum, i.e., for the high Q case of curve 63", the distance $x$ of maximum response (90° tilting) will be farther out. It is so far out, however, that the induced precession signal amplitude which, of course, decreases with increasing separation from the coil, is too small. Thus, the medium Q case of curve 63' is the best. Knowing the best value of Q, the resistance 61 can be selected accordingly. Then the initial ringing current amplitude can be selected from low, medium and high values (e.g., curves 62', 63', and 64') determine the optimum value, and the values of the resistors 55 and 57 can be selected accordingly. Resistors 55 and 57 determine the low level polarizing current value in the FIG. 1 embodiment which, in turn, determines the initial ringing current amplitude I.

In addition to the separation-selective effect produced by adjusting the Q and I of the circuit in the manner described above tending to produce a maximum tilting at a given distance from the coil, this technique of tilting the parallel axes of the synchronously precessing protons away from the direction of the earth's field effectively reduces the contribution to the detected signal of any protons precessing in out-of-phase relation with the synchronously precessing protons since it will, at the same time, tilt the axes of the out-of-phase protons toward the direction of the earth's field, thereby reducing the tendency of out-of-phase protons to cancel the signal from the synchronously precessing protons.

In operation, the instrument 10 is moved continuously through the well bore 12 at a rate of about twenty feet per minute, for example. At periodic intervals, the program control unit 45 signals the timing unit 48 to initiate a measuring operation. In response, the timing unit first energizes the relays 24 and 52, closing the contacts 25, 26 and 54, so as to apply the maximum polarizing current from the direct current power supply 17 to the coil 16. This current condition is illustrated by the horizontal high amplitude portion 65 of the graph shown in FIG. 2. After a selected time interval, which is normally sufficient to assure maximum polarization of the protons in the adjacent formation and may be several seconds long, the time unit releases the relay 52, thereby connecting the resistor 55 in the circuit to the coil 16. At this time, indicated as $t_1$ in FIG. 2, the current in the coil starts to decrease rapidly, following a curve 66 until, about twenty milliseconds later, for example, at a time $t_2$, the current reaches a low level I, producing a field strength H in the region of interest which is on the same order of magnitude as, but preferably not appreciably less than, the strength of the earth's magnetic field. This relatively gradual termination of the strong polarizing current permits the proton alignment to follow the direction of the resultant field as it changes.

Figure 2:
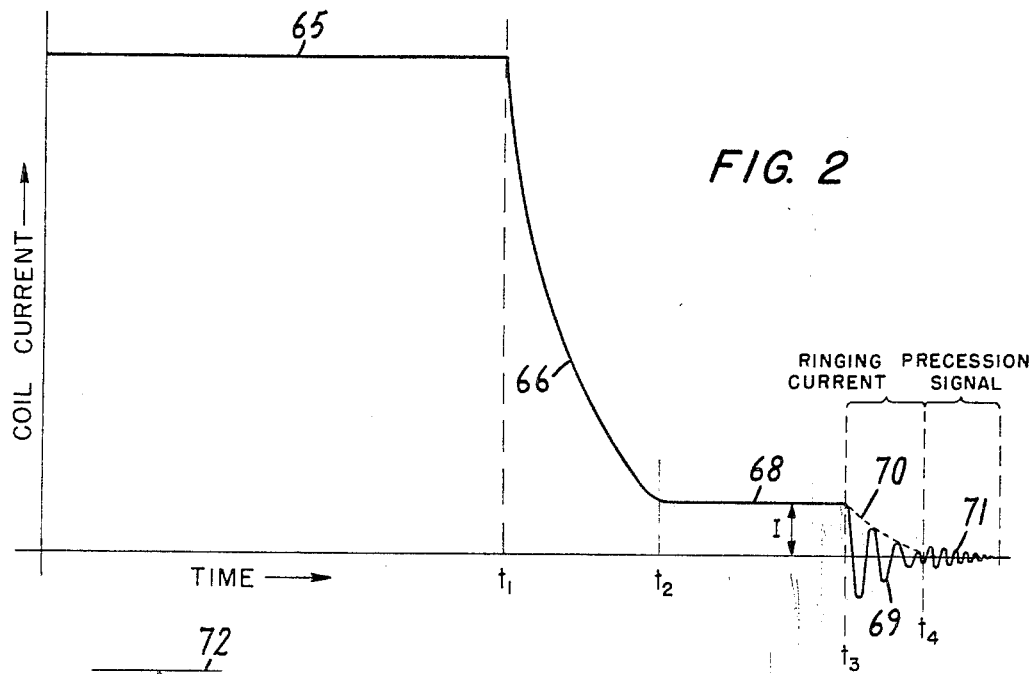
FIG. 2 is a graphical representation showing variations with respect to time in the current passing through the coil of the apparatus of FIG. 1 during a particular nuclear magnetism logging operation.

Thereafter, the current is maintained at the same low level as indicated by the horizontal portion 68 of the graph of FIG. 2 for a further period of about twenty to thirty milliseconds until a time $t_3$ when the relay 24 is deenergized disconnecting the power supply 17 from the coil. At this point, the precession of the polarized protons about the earth's field is initiated but, in order to produce a maximum signal, the synchronously precessing protons are tilted to their maximum angle, as previously described, by permitting the current in the coil 16 to oscillate or "ring" at the resonant frequency of the LCR circuit provided by the coil 16, the capacitor 60 and the resistor 61. This ringing is indicated by the portion 69 of the graph of FIG. 2, the damping rate of the oscillations being represented by the dashed line 70. A few milliseconds later, at a time $t_4$, when the oscillating current in the coil-capacitor circuit has been substantially damped out, the relay 30 is energized to connect the coil 16 through the amplifier 35 to the signal analyzing arrangement at the surface of the earth. Thereafter, the current in the coil 16, represented by the portion 71 of FIG. 2, is induced by the synchronously precessing protons in the formation and, as indicated by FIG. 2, this signal is not only substantially smaller than the oscillating coil current 69 but also terminates quite rapidly, within a few milliseconds.

Figure 3:
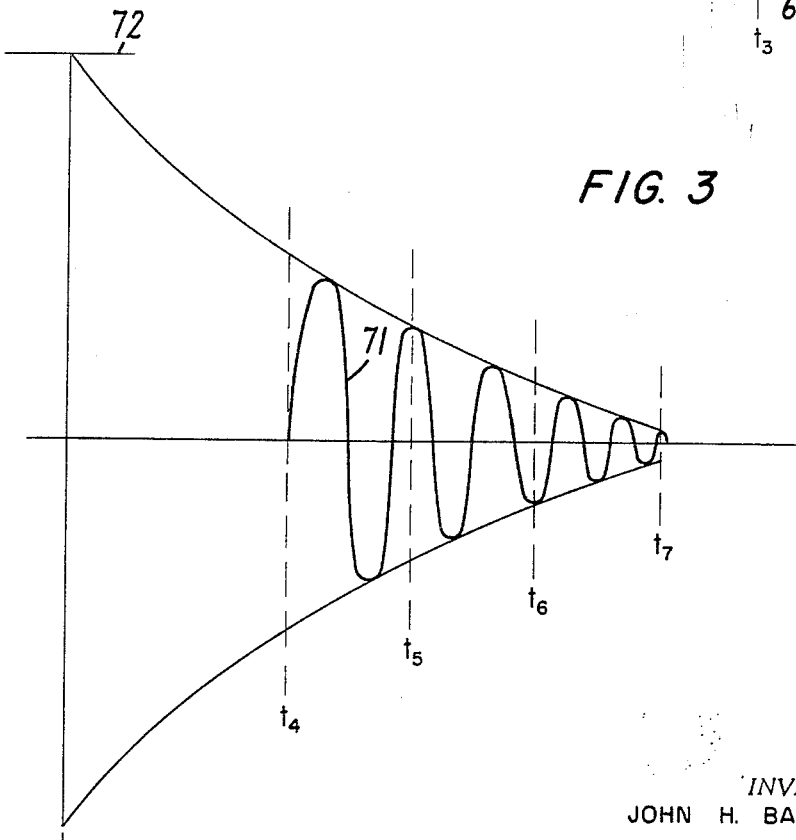
FIG. 3 is an enlarged graphical representation of a portion of the current versus the time graph of FIG. 2.

FIG. 3 is a greatly enlarged illustration of the portion 71 of the FIG. 2 graph illustrating the detected signal from the synchronously precessing protons and indicating the manner of analysis of the signal. After the detected signal has been amplified, it is applied to the signal analyzer 42 which produces indications of the amplitude of the signal at selected times $t_4$, $t_5$, $t_6$, $t_7$, etc., after the coil 16 is connected to the signal analyzing system. In a preferred embodiment, the signal analyzer 42 comprises conventional signal amplitude integrating arrangements producing output signals which represent the average amplitude of the analyzed signal during selected periods of time. In this way, instantaneous signal variations resulting from noise or other interference can be averaged out. Alternatively, of course, a signal analyzer may merely provide the instantaneous D.C. value of the detected signal at the selected times $t_4$, $t_5$, $t_6$, $t_7$, etc. as controlled by signals from the program control unit.

From the signals provided by the analyzer 42, the initial amplitude computer 44, which may be any conventional type of computer, determines the rate of decay of the detected signal and can thereby ascertain, by extrapolation, the amplitude 72 of the detected signal at the time $t_3$ when synchronous precession of the protons was initiated. As previously mentioned, this amplitude value is a measure of the proportion of proton-containing fluid material in the formation 14.

It will be understood that the relative amplitudes of the curves 69 and 71 in FIG. 2 are not to scale and that the actual amplitude of the curve 71 is so small as to be invisible on the graph of FIG. 2 for the illustrated amplitude of the curve 69. For example, a representative initial amplitude 72 of the precession signal current is about 0.1 nanoamperes (100 microamperes) or barely above the thermal noise of the circuit. In contrast, the initial ringing current amplitude I, corresponding to the level 68, may have a value of about 1 milliampere and the polarizing current may have a level 65 on the order of ten amperes. Consequently transient signals which are extremely small with respect to either the high level or the low level polarizing current can completely obliterate the precession signal.

To determine the proton thermal relaxation time, which varies from one type of fluid to another and thereby provides some indication of the type of fluid in the formation 14, the program control unit 45 causes the timing unit to vary the duration of the initial high strength polarizing current 65 for a series of measurements through a sequence from small fractions of a second up to the normal duration of several seconds. By determining the initial precession signal amplitude value 72 for each of the measurements and then ascertaining the rate at which that value approaches a constant level with increasing polarizing time, the relaxation time computer provides indications of the thermal relaxation time of the protons in the formation fluid. In addition, to determne relaxation time at low field strength, the program control unit 45 varies the duration of the low level current 68 through a series af values ranging from the normal time of about twenty to thirty milliseconds up to durations of several seconds, and the relaxation time is determined from the initial signal amplitude values 72 in the same manner as before.

In the alternative circuit arrangement illustrated in the fragmentary view of FIG. 5, the coil-capacitor ringing circuit has a resistor 61' connected in parallel with the coil 16 and the capacitor 60 through two diode rectifiers joined in parallel but in reverse orientation. Furthermore, a Zener diode 80 and another diode 81 are connected in series with one another and in parallel across the capacitor 60 and the coil 16, the Zener diode having a reverse voltage breakdown value of, for example, 150 volts. A gated amplifier 35', also connected across the coil-capacitor circuit, is normally gated in the "off" condition but responds to a signal on the line 51 to receive and amplify signals from the coil 16. Also, the resistor 55, contact 54 and relay 52 of FIG. 1 are not used, the conductor 19 instead being connected directly to the upper end of the resistor 57.

The operation of this circuit is similar in certain respects to that of the FIG. 1 circuit and the coil current is illustrated graphically in FIG. 6, the relative magnitude of the precession signal current being greatly exaggerated as previously described. During application of the polarizing current 85, the diode 81 prevents any current from flowing in the forward direction through the Zener diode 80. At the time $t_1$, when the relay 24 is de-energized to terminate the polarizing current, the polarizing field begins to collapse and, as a result, a large reverse polarity voltage tends to appear across the coil 16 in an effort to maintain the current flowing in the coil. With the switches 25 and 26 open, the resulting current passes through the diode 81 in the forward direction and through the Zener diode 80 in the reverse or breakdown direction. The Zener diode prevents the reverse polarity from becoming too large as the polarizing field collapses and, moreover, maintains the voltage substantially constant at the breakdown level. The resulting constant voltage drop across the coil 16 produces a current decay in the coil as represented by the line 86 in FIG. 6 and the low resistance of the Zener diode produces strong damping (very low Q) so that no ringing can occur.

When the coil current falls to a level I, at which the voltage produced across the Zener diode 80, by its internal resistance, is less than the reverse breakdown voltage, the breakdown ceases and the diode is quickly rendered non-conductive. This is illustrated as occurring at the time $t_2$ in FIG. 6 and, at that time, the circuit begins to oscillate or ring, producing the waveform 87, and the rate of decay 88 of the ringing current is determined by the Q of the circuit which, in turn, depends upon the value $R_p$ of the parallel resistor 61' as indicated by Equation 12. The optimum initial ringing current amplitude I, which depends upon the characteristics of the Zener diode 80, and the optimum circuit Q can be determined in the manner previously described in connection with the FIG. 1 embodiment.

During most of the ringing current decay, either one or the other of the diodes 78 and 79 in series with the resistor 61' is conductive, depending upon the direction of current flow, so that, for practical purposes, their presence may be ignored. Eventually, however, at a time $t_3$, the ringing current has decayed to the point where it is negligible and the voltage is so low, on the order of a few tenths of a volt, that neither of the diodes is conductive in the forward direction. This effectively terminates the ringing current and produces a very high Q circuit connected to the gated amplifier 35', which is turned on at the same time by the signal on the line 51.

Following termination of the ringing current, the signal 89 induced in the coil by the precessing protons which, as previously mentioned, is much smaller than is indicated in the drawings, is detected by the amplifier 35' and transmitted by the conductors 36 and 37 to the analyzing apparatus at the surface of the earth. By integrating this signal over selected periods of time in the manner previously described in connection with FIG. 1, the rate of decay 90 may be determined and extrapolated back to the time of initiation of precession $t_2$ to determine the initial precession signal amplitude.

Although the invention has been described herein with reference to a specific embodiment, many modifications and variations therein will readily occur to those skilled in the art. For example, the various relays in the apparatus described could be replaced by electronic switches, such as silicon controlled rectifiers. Also, further signal amplifiers may be provided where necessary and, if desired, certain of the components described as being located at the surface of the earth may be disposed within the down hole instrument 10, whereas certain of those components shown in that instrument may be located at the surface of the earth. In addition, it will be understood, of course, that the invention may be used to make nuclear magnetism measurements of proton-containing material in other locations than in a well bore, such as in a laboratory at the surface of the earth. Accordingly, all such variations and modifications are included within the intended scope of the invention as defined by the following claims.

I claim:

1. A method of nuclear magnetism measurement comprising impressing a strong polarizing magnetic field upon a sample of material tending to polarize protons in fluid material in the sample at an angle to the direction of a weaker magnetic field, decreasing the strength of the polarizing field to a low level at a relatively gradual rate to permit the polarized protons to follow the changing direction of the resultant of the polarizing field and the weaker magnetic field, terminating the polarizing field when it reaches a magnitude which is comparable to the magnitude of the weaker magnetic field with an oscillating field having an initial amplitude which is small with respect to the initial polarizing field strength and detecting proton precession signals from protons in the sample after termination of the oscillating field.

2. A method of nuclear magnetism logging comprising impressing a strong polarizing magnetic field upon the formation adjacent to a well bore tending to polarize protons in fluid material in the formation at an angle to the direction of the earth's magnetic field, decreasing the strength of the polarizing field to a level comparable to the strength of the earth's field in a time interval much less than that of the relaxation time of the protons in the formation but substantially greater than the period of the Larmor frequency of the protons, oscillating the polarizing field before terminating thereof, terminating the polarizing field, and detecting proton precession signals from protons in the formation.

3. A method of nuclear magnetism logging comprising impressing a strong polarizing magnetic field upon the formation adjacent to a well bore tending to polarize protons in fluid material in the formation at an angle to the direction of the earth's magnetic field, decreasing the strength of the polarizing field to a selected level comparable to the strength of the earth's magnetic field at a relatively gradual rate to permit the polarized protons to follow the changing direction of the resultant of the polarizing field and the earth's magnetic field, maintaining the polarizing field at the selected level for a selected time interval, oscillating the polarizing field at the end of the selected time interval, terminating the polarizing field by decay from the selected level, and detecting proton precession signals from protons in the formation.

4. A method of nuclear magnetism measurement comprising impressing a strong polarizing magnetic field upon a sample of material to polarize protons in fluid material in the sample at an angle to the direction of a weaker magnetic field, reducing the polarizing field strength to a level comparable to that of the weaker field, causing the polarizing field to oscillate at the Larmor frequency of protons in the weaker field before termination of the polarizing field, terminating the oscillating polarizing field by decay, and detecting proton precession signals from protons in the sample.

5. A method of nuclear magnestim logging comprising impressing a strong polarizing magnetic field upon the formation adjacent to a well bore tending to polarize protons in fluid material in the formation at an angle to the direction of the earth's magnetic field, decreasing the strength of the polarizing field to a low level, causing the polarizing field to oscillate at the Larmor frequency of protons in the earth's magnetic field, damping out the oscillating field at a rate dependent upon its initial strength at a selected region in the formation to cause maximum tilting of the axes of the precessing protons with respect to the earth's field direction in that region, and detecting proton precession signals from protons in the formation.

6. A method of nuclear magnetism logging comprising impressing a strong polarizing magnetic field upon the formation adjacent to a well bore tending to polarize protons in fluid material in the formation at an angle to the direction of the earth's magnetic field, decreasing the strength of the polarizing field to a low level comparable to the strength of the earth's field in a time interval much less than that of the relaxation time of the protons in the formation but substantially greater than the period of the Larmor frequency of the protons in the earth's field so as to permit the polarized protons to follow the changing direction of the resultant of the polarizing field and the weaker field, maintaining the polarizing field at the low level for a time substantially shorter than the relaxation time of the protons, causing the polarizing field to oscillate at the Larmor frequency of protons in the earth's magnetic field, damping the oscillating field at a rate dependent upon the initial oscillating field strength at a selected region of the formation to cause maximum tilting of the axes of the precessing protons with respect to the direction of the earth's field in that region, and detecting proton precession signals from protons present in the formation.

7. A method of nuclear magnetism logging comprising impressing a polarizing magnetic field upon the formation adjacent to a well bore tending to polarize protons in fluid material in the formation at an angle to the direction of the earth's magnetic field, causing the polarizing field to oscillate at the Larmor frequency of protons in the earth's magnetic field before termination of the polarizing field, terminating the oscillating field, detecting proton precession signals from protons present in the formation, determining the rate of decay of the precession signal amplitude, and ascertaining from the rate of decay a value representative of the initial amplitude of the proton precession signal at the time of initiation of the oscillating magnetic field.

8. A method of nuclear magnetism logging comprising impressing for at least two different selected periods of time a polarizing magnetic field upon the formation adjacent to a well bore tending to polarize protons in fluid material in the formation, after each of said selected time periods causing the polarizing field to oscillate at the Larmor frequency of protons in the earth's magnetic field and then after each of such oscillations terminating the oscillating field and detecting proton precession signals from the formation after each oscillating field termination, and comparing the magnitude of the detected proton precession signal for the different polarizing periods to determine the relaxation time of the protons in the formation.

9. A method of nuclear magnetism logging according to claim 8 wherein the polarizing field impressed for at least two selected periods of time is a strong polarizing field and including the step of, in each instance, reducing the strong polarizing field to a level comparable to that of the earth's magnetic field before causing it to oscillate.

10. A method of nuclear magnetism logging according to claim 8 wherein the polarizing field impressed for at least two selected periods of time is a low level field having a strength comparable to that of the earth's magnetic field and including, in each instance, the step of first impressing a high strength polarizing magnetic field upon the formation and then reducing the polarizing field strength to the low level.

11. Apparatus for logging nuclear magnetism in the formations surrounding a well bore comprising polarizing coil means adapted to be disposed adjacent to the wall of a well bore, current supply means for supplying current to the coil means to provide a high strength magnetic polarizing field in the formation adjacent to the well bore, coil tuning means to resonate the polarizing coil means at approximately the Larmor frequency of precessing protons in the earth's magnetic field, and current control means for reducing the coil current to a selected finite low level to provide a magnetic polarizing field having a strength comparable to that of the earth's magnetic field and initiating oscillation of the coil current while at that level.

12. Apparatus according to claim 11 wherein the coil tuning means comprises adjustable capacitance means and including resistance means in circuit with the polarizing coil means and the capacitance means having a value selected in conjunction with the final current provided by the current control means to provide proper damping in the coil means-capacitance means circuit to cause maximum tilting of proton axes away from the earth's magnetic field axis at a selected region of the formation.

13. Apparatus according to claim 10 including switch means for connecting the polarizing coil means to signal analyzing means following termination of the polarizing field current.

14. Apparatus according to claim 13 including signal analyzer means for providing indications of the detected signal amplitude in the coil means at selected times after termination of the polarizing field current.

15. Apparatus according to claim 14 including computer means responsive to signals from the analyzer means for providing an indication representing the amplitude of the signal induced in the coil means at the time of termination of the polarizing current.

16. Apparatus according to claim 14 including means for varying the time of application of the current from the current supply means to the coil means, and computer means responsive to signals from the analyzer means for determining the relaxation time of protons in the formation.

17. Apparatus according to claim 11 wherein the current control means includes Zener diode means connected across the polarizing coil means.

18. A method of nuclear magnetism logging comprising impressing a polarizing magnetic field upon the formation adjacent to a well bore tending to polarize protons in fluid material in the formation at an angle to the direction of the earth's magnetic field, causing the polarizing field to oscillate at the Larmor frequency of protons in the earth's magnetic field before termination of the polarizing field, terminating the oscillating field, detecting proton precession signals from protons present in the formation, determining the rate of decay of the precession signal amplitude, and ascertaining from the rate of decay a value representative of the initial amplitude of the proton procession signal at the time of initiation of the oscillating magnetic field, wherein the decay rate of the proton precession signal is determined by integrating the signal amplitude for selected periods of time during detection of the precession signal.

References Cited

UNITED STATES PATENTS

| | | | |
|---|---|---|---|
| 2,999,203 | 9/1961 | Brown | 324—0.5 |
| 2,999,204 | 9/1961 | Jones | 324—0.5 |
| 3,199,022 | 8/1965 | Brown | 324—0.5 |
| 3,234,454 | 2/1966 | Collins | 324—0.5 |
| 3,268,800 | 8/1966 | Hoehn | 324—0.5 |

RUDOLPH V. ROLINEC, Primary Examiner

MICHAEL J. LYNCH, Assistant Examiner